United States Patent [19]

Rezabek

[11] Patent Number: 4,929,930

[45] Date of Patent: May 29, 1990

[54] LIQUID LEVEL CONTROLLER UTILIZING THE RATE OF CHANGE OF A THERMOCOUPLE

[75] Inventor: Dennis J. Rezabek, Kirkland, Ohio

[73] Assignee: Process Technology Inc.

[21] Appl. No.: 261,314

[22] Filed: Oct. 24, 1988

[51] Int. Cl.[5] .............................................. G08B 21/00
[52] U.S. Cl. ...................................... 340/622; 73/295; 219/324; 340/589
[58] Field of Search ............... 340/622, 618, 588, 589; 73/295, 304 R; 219/324; 324/65 R, 549

[56] References Cited

U.S. PATENT DOCUMENTS

| | | | |
|---|---|---|---|
| 1,464,703 | 8/1923 | Fuller | 219/537 |
| 2,576,688 | 11/1951 | Landgraf | 219/318 |
| 2,901,581 | 9/1959 | Stiebel | 200/558 |
| 3,135,860 | 6/1964 | Czarnecki | 219/441 |
| 3,187,161 | 6/1965 | Finn | 219/331 |
| 3,319,049 | 5/1967 | Ulanet | 219/523 |
| 3,444,356 | 5/1969 | Finn | 219/331 |
| 3,450,860 | 6/1969 | Kneisley | 219/331 |
| 3,983,361 | 9/1976 | Wild et al. | 219/433 |
| 4,068,116 | 11/1977 | Lefebvre | 219/523 |
| 4,234,785 | 1/1978 | McKinstry | 219/523 |
| 4,326,199 | 4/1982 | Tarpley et al. | 340/622 |
| 4,583,401 | 4/1986 | Schlindwein et al. | 340/622 X |
| 4,590,797 | 5/1986 | Beaubatie et al. | 340/622 X |
| 4,805,454 | 2/1989 | LeVert | 73/295 |

Primary Examiner—Reinhard J. Eisenzopf
Assistant Examiner—Robert W. Mueller

[57] ABSTRACT

A new and improved level controller for sensing the level of a fluid in a container is provided. The controller includes a heater with a thermocouple connected thereto and wherein the thermocouple is adapted to sense the temperature and the rate of rise of temperature. Immersion of the thermocouple in a fluid cools the thermocouple. When the thermocouple is not immersed in the fluid it is heated by the heating element to establish an alarm condition. An alarm condition is established when the rate of rise of temperature exceeds a predetermined rate of rise and/or when the temperature exceeds a predetermined maximum temperature.

30 Claims, 3 Drawing Sheets

4,929,930

LIQUID LEVEL CONTROLLER UTILIZING THE RATE OF CHANGE OF A THERMOCOUPLE

BACKGROUND OF THE DISCLOSURE

1. Field of the Invention:

The present invention relates to a controller for sensing the presence and absence of a fluid and particularly relates to a controller for sensing the level of a containerized fluid.

Level controllers for sensing the level of a fluid are well known in the prior art. The prior art utilizes metallic sheathed electric heating elements with a bi-metallic thermal switch either embedded within or attached to the electric heating element. The bi-metal switch is heated by the electric heating element. When the unit including the switch and heating element is immersed in a fluid, the fluid cools the bi-metallic switch sufficiently to prevent actuation thereof. When the level of the fluid drops to a predetermined level, at which the bi-metallic switch is no longer immersed in the fluid, the fluid no longer cools the bi-metallic heating element and the element is then heated by the heater thereby actuating the bi-metallic switch. Bi-metallic thermal switches, due to their inherent design, have a limited temperature switching range, and due to their relative mass, are restricted to predetermined positions. Preferably bi-metallic switches are mounted horizontally along their axis. The metallic construction of the bi-metallic switch also limits its application in corrosive fluids. Additionally, failure of a bi-metallic switch is not fail safe due to the fact that the switch can fail in its open or closed condition or the heater can fail without actuation of the bi-metallic switch. Such a failure can go undetected and can have catastrophic consequences when utilized to sense the level of a fluid in a container.

It is also known in the prior art to utilize a heater element and two matched resistance temperature detectors which are disposed in a bridge circuit. If the temperature sensors are unevenly heated, such uneven heating is sensed by the bridge circuit. The resistance temperature detectors can be utilized for flow detection or liquid level/interface detection.

SUMMARY OF THE INVENTION

The present invention utilizes a low watt density electric heating element with a thermocouple connected thereto and wherein the thermocouple is adapted to sense the temperature and the rate of rise of temperature. Immersion of the thermocouple in a fluid cools the thermocouple. When the thermocouple is not immersed in the fluid it is heated by the heating element to establish an alarm signal. The alarm signal is established when the temperature of the thermocouple exceeds a predetermined maximum and/or when the rate of rise of the temperature of the thermocouple exceeds a predetermined maximum rate of rise. In addition, the heating element is monitored and the alarm is actuated when the current through the heating element does not exceed a predetermined minimum value and when the current through the heating element exceeds a predetermined maximum value.

A provision of the present invention is to provide a level controller for sensing the level of a containerized fluid including a heater element and a temperature sensitive element which establishes a first signal indicative of the temperature at a location adjacent to the heater element, which temperature is indicative of whether the temperature sensitive element is immersed in the fluid. A first means sets a predetermined maximum rate of change for the first signal and a control means is responsive to the first signal for establishing a second signal in the event that the first signal exceeds the predetermined maximum rate of change for said first signal.

Another provision of the present invention is to provide a level controller as set forth in the preceeding paragraph wherein the second signal is an alarm signal which is indicative that the fluid has dropped below a predetermined level.

A still further provision of the present invention is to provide a control for sensing the presence and absence of a fluid at a particular location including a heater element, a temperature sensitive element, the heater element adapted to have the heat generated thereby dissipated by the presence of a fluid to affect cooling of the temperature sensitive element, the temperature sensitive element establishes a first signal indicative of the temperature of a location adjacent to the heater element which is indicative of whether the temperature sensitive element is cooled by the fluid, first means for setting a predetermined maximum rate of change for the first signal and control means responsive to the first signal for establishing a second signal in the event that the first signal exceeds said predetermined maximum rate of change for the first signal.

A still further provision of the present invention is to provide a new and improved method for determining whether the level of a fluid in a container is above a predetermined level including the steps of providing a heat source, sensing the heat generated by the heat source at the predetermined level, sensing the rate of rise of the heat generated by the heat source at the predetermined level, establishing a maximum rate of rise of the heat at said predetermined level, and comparing the sensed rate of rise of the heat with the established maximum rate of rise of the heat and establishing a control signal if the sensed rate of rise of temperature at the particular level is equal to or greater than the established maximum rate of rise for the temperature.

DESCRIPTION OF THE PREFERRED EMBODIMENT

Figure 1:
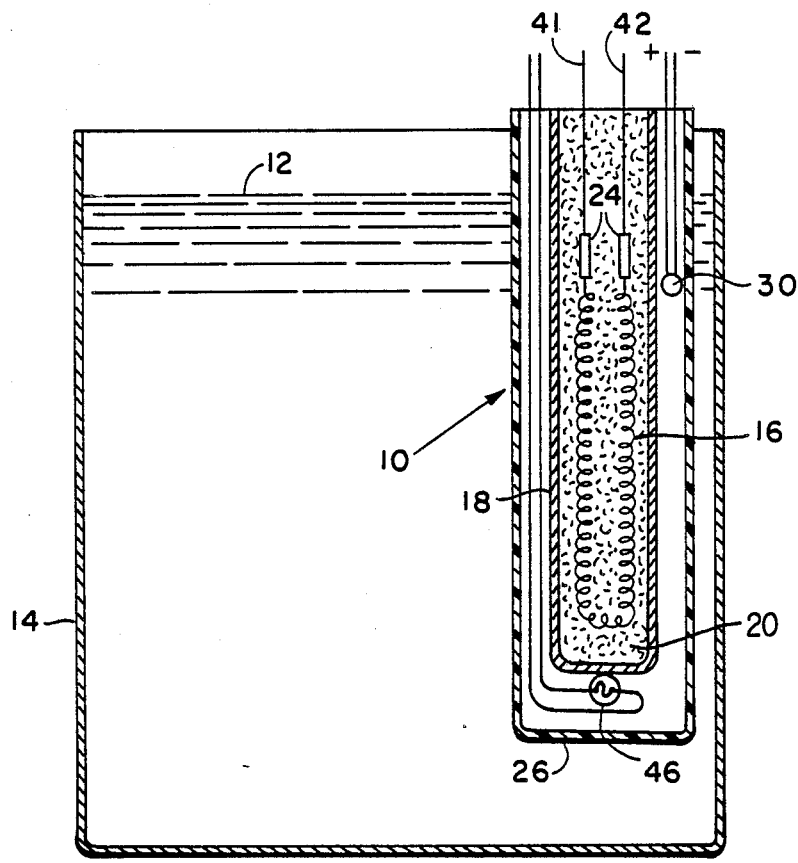
FIG. 1 is a schematic illustration of the heater element which has been enlarged for illustration purposes relative to the size of the container and the temperature sensitive element located within a containerized fluid for sensing the level thereof.

An electrical heating element, generally indicated at 10, is utilized for sensing the level of a fluid 12 disposed within a container 14. The electric heating element 10 is a preferably an electrical heating element constructed of a resistance wire 16 which produces heat by virtue of power dissipation through the resistance wire 16. The resistance wire 16 is disposed within a metallic sheath 18 which is packed with a thermally conductive electrically resistant material such as magnesium oxide 20. The electrical resistance wire 16 is electrically connected to an energy supply using specially insulated copper hookup wires 41 and 42 which are connected to resistance wire 16 using metallic "crimp type" compression connectors at the junction 24 between the copper hookup wires 41 and 42 and the resistance wire 16. This connection between the resistance wire 16 and the copper hookup wires 41 and 42 is commonly referred to as the "cold pin connection" in the electric heater manufacturing industry. Preferably, a fluoropolymer sleeve 26 surrounds the metallic sheath 18 to protect the metallic sheath 18 and electrical heating element from corrosive environments.

A thermocouple 30 is connected to the metallic sheath 18 adjacent the cold pin connection. The thermocouple 30 is adapted to sense the heat generated upon energization of the electric resistance wire 16. If the thermocouple 30 is immersed in the fluid 12, the fluid 12 will dissipate a portion of the heat generated by the resistance wire 16 to limit the temperature sensed by the thermocouple 30. In the event that the thermocouple 30 is no longer immersed in the fluid 12, the fluid 12 no longer acts to dissipate the heat at the thermocouple 30 and the temperature of the thermocouple 30 will increase. Additionally, when the level of fluid 12 drops so that the thermocouple 30 is no longer immersed therein, the rate of rise of temperature associated with the thermocouple 30 will increase substantially over that associated with a normal operating condition when the thermocouple 30 is immersed in the fluid 12. Thus, an increase in the temperature of the thermocouple 30 and/or an increase in the rate of rise of the temperature of the thermocouple 30 will be indicative that the thermocouple 30 is not immersed in the fluid 12. Thus, by locating the thermocouple 30 in a predetermined location, the presence or absence of fluid 12 can be sensed and such information can be used to determine if the level of fluid 12 exceeds a predetermined level at which the thermocouple 30 is located.

The temperature profile on the outside surface of the metallic sheath 18, in any fluid, is a result of the energy dissipated to the surrounding fluid and the thermal path through which this energy must flow. Generally, the temperature varies as the distance from the location of the metallic sheath increases. The temperature profile is subject to the largest gradiant adjacent the cold pin connection. Thus, by locating the thermocouple 30 adjacent to the cold pin connection, the thermocouple 30 will be subjected to the maximum rate of change of temperature when the fluid level varies at the thermocouple 30.

It should be appreciated that the heat dissipation capacity of the fluid 12 will vary in view of the composition of the fluid. Some fluids will dissipate thermal heat better than other fluids. Therefore, the maximum temperature associated with the thermocouple 30 when immersed in the fluid will be dependent upon the composition of the fluid 12.

Figure 2:
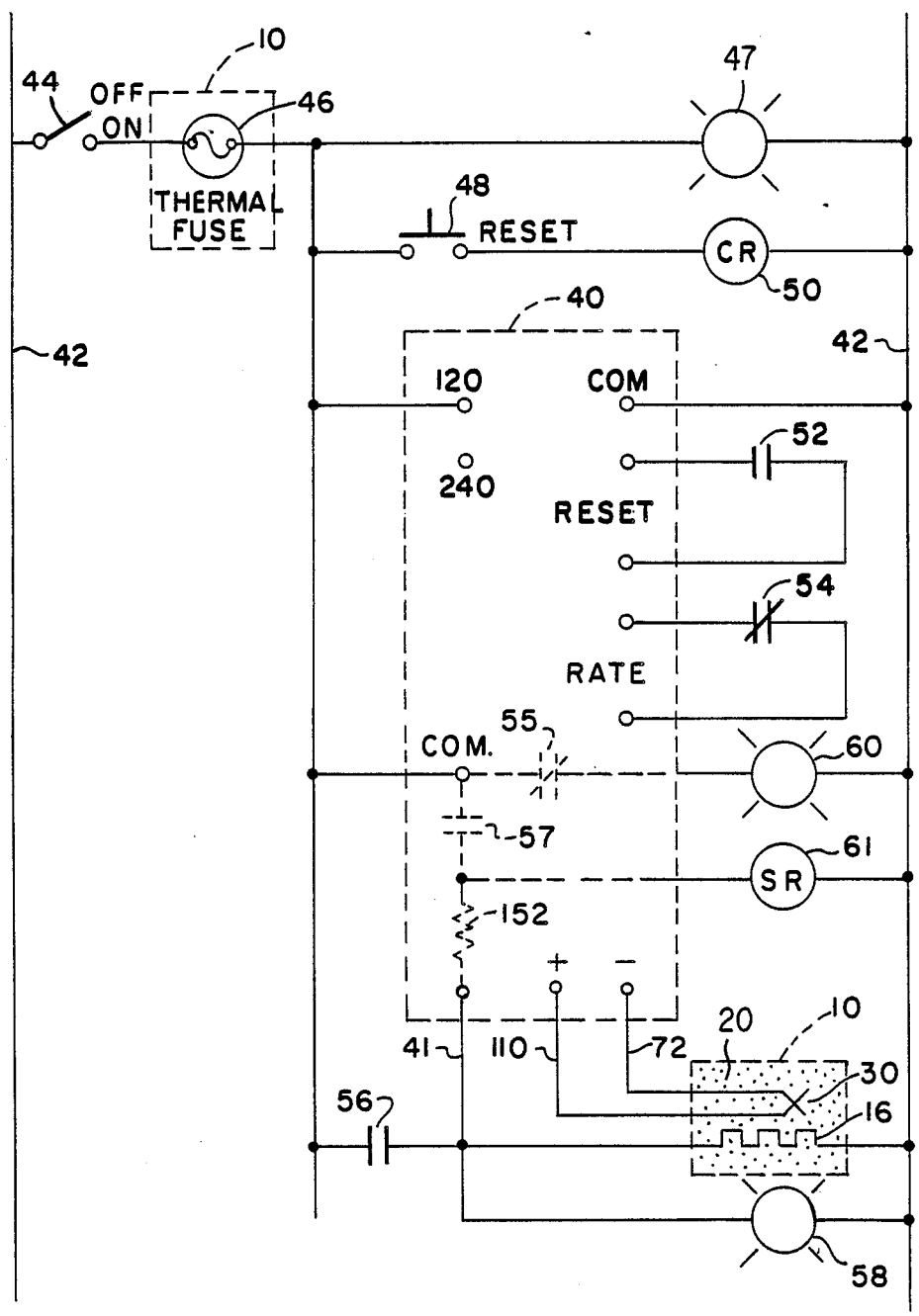
FIG. 2 is a schematic illustration of the inputs and outputs associated with the controller of the present invention.

Referring more particularly to FIG. 2, the basic inputs and outputs to a control 40 for sensing the level of the fluid 12 in the container 14 are disclosed. The control 40 is connected to the power lines 42 via a switch 44. Connected in series with the switch 44 is a thermal fuse 46 which acts as a fail-safe device. The thermal fuse 46 is located in the heater element 10 outside of the metallic sheath 18 and below the heater element 16 as is illustrated in FIG. 1. The thermal fuse 46 is operable to melt when subjected to a predetermined maximum temperature to disconnect power from the control 40. The thermal fuse 46 acts as a fail-safe device in that if a predetermined maximum temperature is exceeded at the fuse 46, which is indicative of the level of the fluid dropping below the thermocouple 30, the thermal fuse will deactuate the control 40 to affect de-energization thereof and de-energization of the power to the electrical resistance wires 16, thus shutting down the control 40 and heater 10. The thermal fuse 46 will only be actuated in the event that the control 40 malfunctions and does not indicate that the fluid 12 has fallen below a predetermined level. If the control 40 does not malfunction, it will alert the operator to the low fluid condition prior to actuation of the thermal fuse 46.

When the on/off switch 44 is closed, indicator light 47 will be energized indicating that the control 40 is now energized. In order to energize the heater 10, a momentary, spring-loaded reset or an enable switch 48 must be closed. When reset switch 48 is closed a control relay 50 will be energized. As will be disclosed more fully herein below the reset switch 48 is a spring-loaded switch which must be manually held in for a period of time to allow the electrical resistance wire 16 to reach a predetermined temperature or predetermined rate of rise of temperature before allowing switch 48 to open. When switch 48 is released it will automatically open. As will be disclosed more fully herein below, the rate of rise of temperature associated with the thermocouple 30 is sensed and if the rate of rise of temperature exceeds a predetermined maximum rate, an alarm condition occurs. Upon initial energization of the heater element 16, the rate of rise of temperature of the thermocouple 30 will be above the predetermined maximum rate of rise, as the thermocouple 30 is heated by the resistance wire 16. After the thermocouple 30 reaches a certain temperature, the rate of rise of temperature associated with the resistance wire 16 and the thermocouple 30 will decrease below the predetermined maximum and switch 48 can be released.

Control relay 50 includes normally open contacts 52, normally closed contacts 54, and normally open contacts 56. Normally open contacts 56 provide power to energize the heater element 16 only when the reset switch 48 is manually held in its closed condition and control relay 50 is energized. Upon initial closing of reset switch 48, relay contacts 56 close to energize the resistance wire 16 and when the reset switch 48 is released, the control relay 50 is de-energized and contacts 56 open. Thereafter, the heater wire 16 is energized via leads 41 of the control 40. Closing of relay contacts 52 will energize a reset/enable circuit 139 as is more fully disclosed in FIG. 3 and opening of relay contacts 54 will disable a rate of change circuit to prevent an alarm condition from occurring during initial heat up of the resistance wire 16 when reset switch 48 is manually closed. Upon initial power up of the resistance wire 16 an indicating light 58 will be lit to indicate that the level of fluid in the container 14 is above a predetermined level. The indicating light 58 will remain lit as long as the resistance wire 16 is energized. De-energization of the resistance wire 16 is indicative of the drop in the fluid level or a failure in the control 40 which will effect extinguishment of the indicator light 58. In addition, an indicator light 60 is provided to indicate an alarm condition when the level of fluid in the container drops below a predetermined level. Indicator light 60 is connected to normally closed contacts 55 associated with a control relay 53, more fully illustrated in FIG. 3, which will close to energize indicator light 60 when the fluid level drops below a predetermined level.

Figure 3:
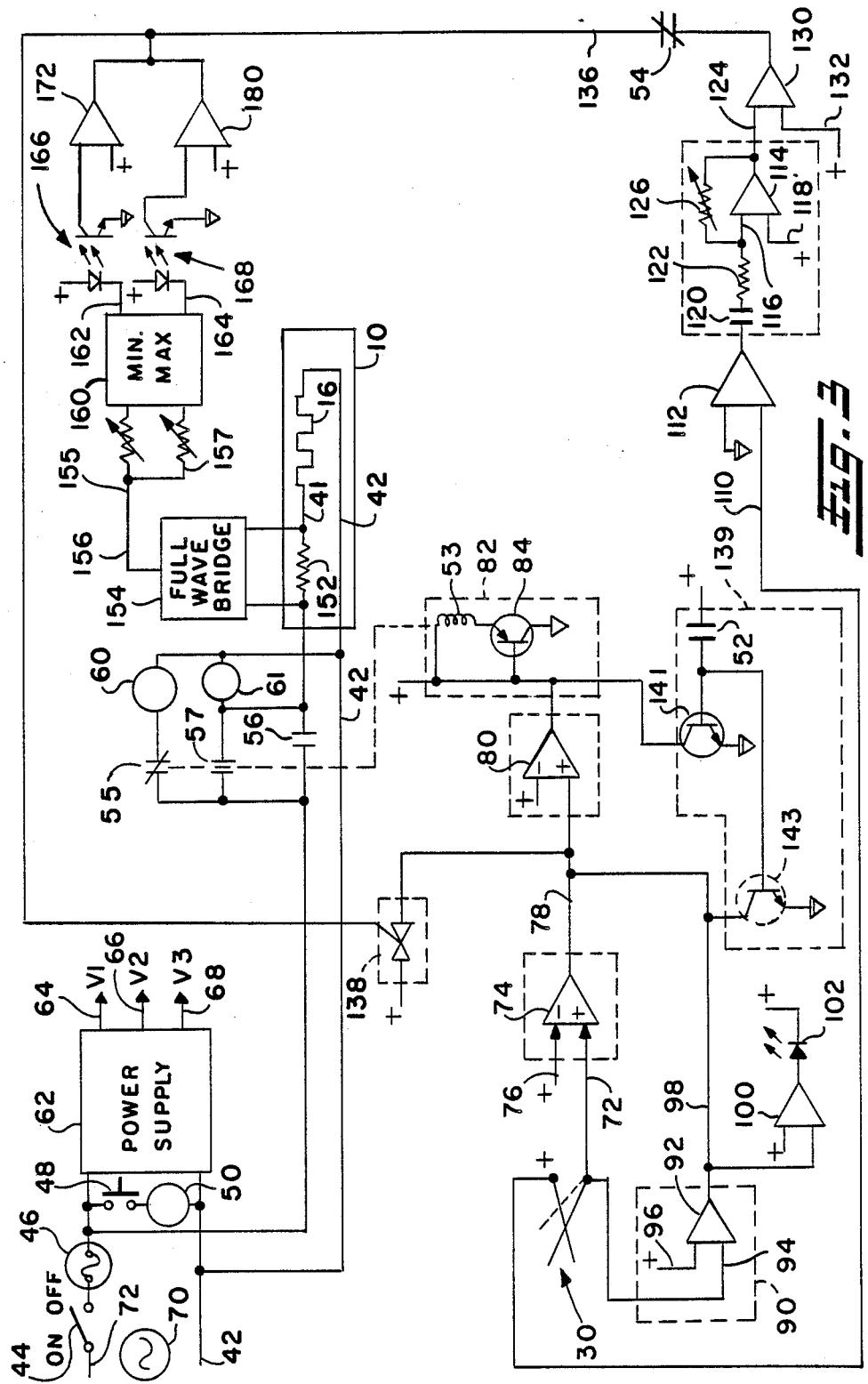
FIG. 3 is a schematic diagram of the controller associated with the present invention.

The control 40 which is more fully illustrated in FIG. 3, includes a standard power supply 62 which includes a plurality of D.C. outputs 64, 66 and 68 which establish predetermined voltage levels for energizing the various components of the control 40. The on/off switch 44 is provided in the incoming power lines 42 from a suitable AC source 70 to effect energization of the power supply 62. The thermal fuse 46 is associated with the power supply to effect de-energization thereof and of the entire control 40 including the heating element 10, when the temperature of the thermal fuse 46 exceeds a predetermined temperature. It should be appreciated that the use of the thermal fuse 46 is a distinct improvement over the common bi-metallic controls which do not use a thermal fuse in that the thermal fuse 46 acts as fail-safe control to de-energize the control 40 and de-energize heater element 16 when the thermal fuse 46 senses a predetermined temperature.

The thermocouple 30 is operable to establish a first signal on line 72 which is indicative of the temperature sensed by the thermocouple 30. A reference signal is established on line 76 which is indicative of the maximum predetermined temperature to be sensed by the thermocouple 30. The reference signal may be varied to adjust the maximum predetermined temperature at which an alarm condition is established to accommodate various fluids and various operating conditions. When the maximum predetermined temperature is exceeded, it is indicative of the fact that the thermocouple 30 is no longer cooled by the fluid 12 and hence the level of the fluid has dropped beneath the predetermined level at which the thermocouple 30 is located. A comparator 74 is operative to receive the first signal from the thermocouple 30 on line 72 and compare it with the reference signal established on line 76. When the temperature sensed by the thermocouple 30 exceeds the reference maximum temperature, the output of the comparator 74 will go high and will be directed on line 78 through an amplifier 80 to a trigger circuit 82 which is operable to establish a second signal indicative of the predetermined maximum temperature being exceeded.

The trigger circuit 82 includes a transistor 84 having its collector emitter connected in series with a control relay 53 which includes normally closed contacts 55 and normally open contacts 57. The control relay 53 is normally energized and transistor 84 is normally conductive when control 40 is operating and an alarm condition is not sensed. When the comparator 74 senses that the predetermined maximum temperature as set by the reference 76 has been exceeded, the comparator 74 will establish a high output on line 78, through amplifier 80, which will be directed to the base of transistor 84 to render transistor 84 non-conductive and de-energize relay 53. De-energization of relay 53 will close normally closed relay contacts 55 to light indicator light 60, which is indicative of a low fluid level and open normally open contacts 57 to de-energize resistance wire 16 and energize an alarm circuit, via a slave relay 61. The slave relay 61, more fully illustrated in FIG. 2, is a relay having a plurality of control contacts which can be configured as normally opened or normally closed. The action of slave relay 61 results in the normally closed contacts, when connected to a power source, actuating devices requiring power in an alarm condition and the normally open contacts thereof, when connected to a power source, deactivating devices in an alarm condition. While the relay contacts 57 are disclosed as energizing an alarm via a slave relay 61, it should be realized that the contact 57 or slave relay 61 could be utilized in various manners of control to sound an audible alarm, light an indicator light or control a circuit to add more fluid to the container 14.

A thermocouple continuity and polarity sensing circuit 90 is also associated with the thermocouple 30 to ensure that the thermocouple 30 is connected and is connected with the correct polarity into the control circuit 40. The polarity reversal circuit 90 includes a comparator 92 which compares the output of the thermocouple 30 on line 94 with a reference signal on line 96. If the polarity of the thermocouple 30 is incorrect or if thermocouple 30 is absent, a high signal will be established from the comparator 92 on line 98 which will be directed to amplifier 100 which energizes a light emitting diode 102 which establishes a visual signal in the event the polarity of the thermocouple 30 is reversed. The comparator 92 also establishes a high signal on line 98 which is directed to line 78 to energize the trigger circuit 82 via amplifier 80. Thus, if the thermocouple 30 is incorrectly connected or not connected within the circuit, the trigger circuit 82 will be de-energized to denergize transistor 84 and relay 53 to establish an alarm signal and the light emitting diode 102 will be energized to establish a visual indication that the thermocouple 30 is missing or incorrectly connected.

The thermocouple 30 also establishes a signal on line 110 which is indicative of the temperature sensed by the thermocouple. The signal on line 110 is directed through an amplifier 112 to a amplifier 114. The amplifier 114 includes a pair of inputs 116 and 118. The output of amplifier 114 is fed back to the input 116 of amplifier 114 via a variable resistor 126. The output of amplifier 112 is directed via a capacitor 120 and resistor 122 to the input terminal 116 of amplifier 114. The capacitor 120 and resistors 122 and 126 form a feedback circuit to differentiate the output of the amplifier 112 and thus direct a signal to the input 116 of a comparator 130 which is indicative of the rate of change of the output of the thermocouple 30. The comparator 130 includes an input 132 which has a signal applied thereto indicative of a preset maximum rate of rise of the output signal from the thermocouple 30. The rate of rise of the current on line 72 is indicative of the rise of the output signal from thermocouple 30. When the output of the amplifier 114 exceeds the maximum rate of rise established for the thermocouple 30, the comparator 132 will establish a signal on its output line 136 which will be directed to a triac 138. Energization of triac 138 establishes a high signal on line 78 to de-energize trigger 82 to trigger an alarm condition. Sensing the rate of rise of the output signal from the thermocouple 30 is operable to effect an alarm condition prior to a predetermined temperature being sensed and thus renders the control more sensitive and faster acting than prior art controls.

It should be appreciated that the normally closed contacts 54 associated with the control relay 50 are disposed in the output line 136. Contacts 54 are initially opened when reset 48 is manually depressed to energize control relay 50 to prevent the comparator 130 from actuating an alarm condition during initial power up of the control and heater element 16. Upon initial power up the rate of rise of temperature associated with the resistance wire 16 and the thermocouple 30 will exceed the predetermined maximum rate $e& on the input 132 to the comparator 130. Hence, it is desirable to prevent the output of the comparator 130 from energizing an alarm signal when the heater is initially powered up.

When the rate of rise of the heater element 16 levels off after a short time after initial energization, the control relay contacts 54 are closed when reset 48 is released to allow the maximum rate of rise circuit to function. When the rate of rise of the temperature associated with thermocouple 30 exceeds the reference predetermined maximum rate of rise it will be indicative of the fact that the thermocouple is no longer immersed in the fluid and a feedback signal will be directed to triac 138 to establish a high signal on line 78 and hence de-energize the trigger circuit 82 to de-energize relay 53 to establish an alarm condition indicative of a level of fluid dropping below a predetermined level.

The normally opened contacts associated with the control relay 50 energize reset circuit 139 which includes transistors 141 and 143. When control relay 50 is energized, transistor 141 and 143 are rendered conductive when contacts 52 are closed to respectively insure that transistor 84 is conductive and that the signal on line 78 is low.

The current and voltage through the resistance wire 16 are monitored via a current dropping resistor 152 disposed in series with the resistance wire 16. A full-wave bridge 154 is connected across the current dropping resistor 52 and establishes a signal on line 156 which is indicative of both the voltage and current passing through the heater element 16. The signal on line 156 is directed to a quad operational amplifier 160 which is operable to establish a signal when a predetermined maximum voltage is exceeded and when a predetermined minimum voltage is not exceeded. The operational amplifier 160 includes a pair of inputs 155, and 157 and a pair of outputs 162 and 164 which are respectively connected to optoisolators 166 and 168. The optoisolators 166 and 168 consist of a LED and a phototransistor. When the voltage across dropping resistor 152 is below a predetermined minimum, that segment of the operational amplifier 160 is rendered conductive turning on optoisolator 166 which is connected to an amplifier 172 to establish a signal on line 136 indicative of an alarm condition. When a predetermined maximum voltage across dropping resistor 152 is exceeded a signal will be established on line 164 through optoisolator 168 connected to amplifier 180 to establish a signal on line 136 indicative of an alarm condition. The output on line 136 is directed to the the triac 138 to establish a high signal on line 78 and de-energize the trigger circuit 82 to de-energize relay 53 to establish an alarm condition. It should be apparent that the alarm condition will occur when a malfunction of the heater element occurs. A malfunction will occur and an alarm will be actuated when the heater element is shorted and the maximum voltage is exceeded, when the heater element is open circuited and the minimum voltage is not exceeded or when the input power to the heater wire 16 is disrupted.

From the foregoing it should be apparent that a new and improved level controller for sensing the presence and absence of a fluid has been provided. While the control has been specifically described as sensing the level of a fluid in a container, it should be appreciated that the control could also be utilized to sense the presence and absence of a fluid at a particular location such as the flow of fluid through a pipe wherein the presence of fluid cools the thermocouple 30 and the absence of fluid allows the thermocouple 30 to be heated by the heater element 16. The control is a fail-safe control which is operable to sense when a predetermined temperature associated with the heater element is exceeded, when a predetermined rate of rise of temperature is exceeded, when the heater element burns out and is open circuited or short circuited and is fail-safe in that a thermal fuse is provided to de-energize the control and heater and establish an alarm signal in the event that the thermal fuse exceeds a predetermined temperature.

What I claim is:

1. A level controller for sensing the level of a containerized fluid comprising a heater element, a temperature sensitive element operatively associated with said heater element, said temperature sensitive element establishing a first signal indicative of the temperature at a location adjacent said heater element, which temperature is indicative of whether said temperature sensitive element is immersed in the fluid, first means for setting a predetermined maximum rate of change for said first signal which is indicative that said temperature sensitive element is sensing a temperature rise in excess of a predetermined maximum rate and that the temperature sensitive element is not immersed in the fluid and control means responsive to said first signal for establishing a second signal in the event that the rate of change of said first signal exceeds said predetermined maximum rate of change for said first signal.

2. A level controller for sensing the level of a containerized fluid as defined in claim 1 further including voltage sensing means for sensing the voltage flow in said heater element and actuating said control to establish said second signal in the event that said voltage sensing means senses voltage above a predetermined maximum value and in the event that said voltage sensing means senses voltage below a minimum predetermined value.

3. A level controller for sensing the level of a containerized fluid as defined in claim 2 further including a thermal fuse for establishing a signal to actuate said control in the event the temperature sensed by said thermal fuse exceeds a predetermined maximum value.

4. A level controller for sensing the level of a containerized fluid as defined in claim 1 further including a thermal fuse for establishing a signal to actuate said control in the event the temperature sensed by said thermal fuse exceeds a predetermined maximum value.

5. A level controller for sensing the level of a containerized fluid as defined in claim 1 further including first means for setting a predetermined maximum for said first signal which is indicative that said temperature sensitive element is sensing a temperature in excess of a predetermined maximum temperature and that said temperature sensitive element is not immersed in the fluid, said control means being responsive to said first signal for establishing said second signal in the event that said first signal exceeds said predetermined maximum to indicate that a predetermined temperature has been exceeded.

6. A level controller for sensing the level of a containerized fluid as defined in claim 5 wherein said second signal is an alarm signal which is indicative that the temperature sensitive element is not immersed in the fluid.

7. A level controller for sensing the level of a containerized fluid as defined in claim 7 wherein said temperature sensitive element is a thermocouple and said first signal is proportional to the temperature of said thermocouple, said thermocouple being heated by said heater element and cooled by the fluid when immersed therein.

8. A level controller for sensing the level of a containerized fluid as defined in claim 7 wherein said thermocouple is operative when connected with a first polarity to said control and is inoperative when connected with a second polarity, opposite said first polarity, to said control and further including indicating means for indicating that said thermocouple is incorrectly connected to said control.

9. A level controller for sensing the level of a containerized fluid as defined in claim 7 wherein said heating element includes a resistance wire and an electrical lead connected to said resistance wire to convey energy thereto, said thermocouple being located at the connection of said electrical lead to said resistance wire.

10. A level controller for sensing the level of a containerized fluid as defined in claim 1 wherein said second signal is an alarm signal which is indicative that the temperature sensitive element is not immersed in the fluid.

11. A level controller for sensing the level of a containerized fluid as defined in claim 1 wherein said temperature sensitive element is a thermocouple and said first signal is proportional to the temperature of said thermocouple, said thermocouple being heated by said heater element and cooled by the fluid when immersed therein.

12. A level controller for sensing the level of a containerized fluid as defined in claim 1 further including means for monitoring the condition of the heater element and actuating said control to establish said second signal in response to a malfunction of said heater element.

13. A level controller for sensing the level of a containerized fluid as defined in claim 12 wherein said means for monitoring the condition of said heater element includes voltage sensing means for sensing the voltage across said heater element and actuating said control to establish said second signal when said heater element is shorted and said voltage across said heater element is above a predetermined maximum voltage.

14. A level controller for sensing the level of a containerized fluid as defined in claim 12 wherein said means for monitoring the condition of said heater element includes voltage sensing means for sensing the voltage across said heater element and actuating said control to establish said second signal when said heater element burns out and is open circuited and said voltage across said heater element is below a predetermined maximum voltage.

15. A control for sensing the presence and absence of a fluid at a particular location comprising a heater element, a temperature sensitive element operatively associated with said heater element to be heated thereby, said heater element adapted to have the heat generated thereby dissipated by the presence of the fluid to effect cooling of said temperature sensitive element, said temperature sensitive element establishing a first signal indicative of the temperature of a location adjacent said heater element which temperature is indicative of whether said temperature sensitive element is cooled by the fluid, first means for setting a predetermined maximum rate of change for said first signal which is indicative that said temperature sensitive element is sensing a temperature rise in excess of a maximum rate of rise and that said temperature sensitive element is not being cooled by the fluid and control means responsive to said first signal for establishing a second signal in the event the rate of change of said first signal exceeds said predetermined maximum rate of change for said first signal.

16. A control for sensing the presence and absence of a fluid at a particular location as defined in claim 15 further comprising second means for setting a predetermined maximum for said first signal which is indicative that said temperature sensitive element is sensing a temperature in excess of a predetermined maximum temperature and that the temperature sensitive element is not being cooled by the fluid, said control means being responsive to said first signal to establish said second signal in the event that said first signal exceeds said predetermined maximum for said first signal to indicate that a predetermined temperature has been exceeded.

17. A control for sensing the presence and absence of a fluid at a particular location as defined in claim 15 further including voltage sensing means for sensing the voltage across said heater element and actuating said control to establish said second signal in the event said voltage sensing means senses voltage above a predetermined maximum value which is indicative of a short in said heater element.

18. A control for sensing the presence and absence of a fluid as defined in claim 17 further including a thermal fuse for establishing a cut-off signal to de-energize said heater and actuate said control to establish said second signal in the event the temperature sensed by said thermal fuse exceeds a predetermined maximum level.

19. A control for sensing the presence and absence of a fluid as defined in claim 18 wherein said second signal is an alarm signal which is indicative of said temperature sensitive element not being cooled by the fluid.

20. A control for sensing the presence and absence of a fluid as defined in claim 17 wherein said voltage sensing means is further operable to actuate said control and establish said second signal in the event the voltage sensing means senses voltage below a predetermined minimum value which is indicative that said heater element is burned out and open circuited.

21. A control for sensing the presence and absence of a fluid as defined in claim 15 further including a thermal fuse for establishing a cut-off signal to de-energize said heater element and actuate said control to establish said second signal in the event the temperature sensed by said thermal fuse exceeds a predetermined maximum level.

22. A control for sensing the presence and absence of a fluid as defined in claim 15 wherein said second signal is an alarm signal which is indicative of said temperature sensitive element not being cooled by the fluid.

23. A control for sensing the presence and absence of a fluid as defined in claim 15 wherein said temperature sensitive element is a thermocouple and said first signal is proportional to the temperature of said thermocouple, said thermocouple being heated by said heater element and cooled by the fluid when the fluid is present.

24. A control for sensing the presence and absence of a fluid as defined in claim 23 wherein said thermocouple is operative when connected with a first polarity to said control and is inoperative when connected with a second polarity, opposite said first polarity, to said control and further including indicating means for indicating that said thermocouple is incorrectly connected to said control.

25. A control for sensing the presence and absence of a fluid as defined in claim 22 wherein said thermocouple and said heater element are surrounded by a protective sheath of fluoropolyomer material.

26. A control sensing the presence and absence of a fluid as defined in claim 23 wherein said heater element includes a resistance wire and an electrical lead connected to said resistance wire for supplying power thereto, said thermocouple being located adjacent the connection of said electrical lead and said resistance wire.

27. A control for sensing the presence and absence of a fluid as defined in claim 15 further including means for monitoring the condition of the heater element and actuating said control to establish said second signal in response to a malfunction of said heater element.

28. A method for determining whether the level of a fluid in a container is above a predetermined level comprising the steps of:
providing a heat source;
sensing the heat generated by the heat source at said predetermined level in the container, the heat sensed being greater if the fluid is not at said predetermined level;
sensing the rate of rise of the heat generated by the heat source at said predetermined level, the rate of rise of heat sensed being greater if the fluid is not at said predetermined level;
establishing a maximum rate of rise of the heat at said predetermined level which if exceeded is indicative of the fluid not being present at said predetermined level; and
comparing the sensed rate of rise of the heat with the established maximum rate of rise of the heat and establishing a control signal if said sensed rate of rise of temperature at said particular level is equal to or greater than said established maximum rate of rise for said temperature.

29. The method of determining whether the level of a fluid in a container is above a predetermined level as defined in claim 28 further including the steps of:
establishing a maximum temperature at said level which if exceeded is indicative of the fluid not being pres at said predetermined level; and
comparing the sensed heat and the established maximum at said particular level and establishing a control signal if said sensed temperature is equal to or greater than said established maximum temperature.

30. The method of determining whether the 1 of a fluid in a container is above a predetermined level as defined in claim 29 wherein the step of establishing a control signal includes the step of establishing an alarm signal indicative that the fluid has dropped below said predetermined level.

* * * * *